(12) United States Patent
Sugiyama

(10) Patent No.: US 8,125,662 B2
(45) Date of Patent: Feb. 28, 2012

(54) DEPARTMENT MANAGEMENT PRINTING SYSTEM AND METHOD, PROGRAM PRODUCT USED IN DEPARTMENT MANAGEMENT PRINTING, AND AUTHENTICATION METHOD

(75) Inventor: Kouichi Sugiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 11/485,522

(22) Filed: Jul. 13, 2006

(65) Prior Publication Data

US 2006/0250633 A1   Nov. 9, 2006

Related U.S. Application Data

(63) Continuation of application No. 10/318,130, filed on Dec. 13, 2002, now Pat. No. 7,136,176.

(30) Foreign Application Priority Data

Dec. 25, 2001   (JP) .................................. 2001-391652

(51) Int. Cl.
*G06K 15/00* (2006.01)
*G06F 3/12* (2006.01)

(52) U.S. Cl. ...................... 358/1.14; 358/1.13; 358/1.15
(58) Field of Classification Search .................. 713/170, 713/155, 151; 358/1.14
See application file for complete search history.

(56) References Cited

U.S. PATENT DOCUMENTS

| 6,141,751 A | 10/2000 | Ogawa .......................... 713/170 |
| 6,378,070 B1 * | 4/2002 | Chan et al. ..................... 713/155 |
| 6,545,767 B1 * | 4/2003 | Kuroyanagi ................. 358/1.14 |
| 6,711,677 B1 * | 3/2004 | Wiegley ........................ 713/151 |
| 6,862,583 B1 * | 3/2005 | Mazzagatte et al. ............ 705/64 |
| 7,185,273 B2 * | 2/2007 | Thomason .................... 715/225 |
| 2003/0002066 A1 * | 1/2003 | Miyano ........................ 358/1.14 |

* cited by examiner

*Primary Examiner* — Vincent Rudolph
(74) *Attorney, Agent, or Firm* — Fitzpatrick, Cella, Harper & Scinto

(57) ABSTRACT

Incapability of printing as a result of prohibition of authentication due to a difference between functions of authentication processing in printing apparatuses is prevented, by acquiring a function of authentication processing of a concerned printing apparatus. It is determined whether or not inputted identification information can be processed by authentication processing of the printing apparatus, based on the acquired function. If the result of the determination is negative, a data format of the inputted identification information is converted.

8 Claims, 12 Drawing Sheets

DEPARTMENT MANAGEMENT PRINTING SYSTEM AND METHOD, PROGRAM PRODUCT USED IN DEPARTMENT MANAGEMENT PRINTING, AND AUTHENTICATION METHOD

RELATED APPLICATION

This application is a continuation of application Ser. No. 10/318,130, filed Dec. 13, 2002, the entire contents of which are incorporated herein by reference.

BACKGROUND OF THE INVENTION

1. Field of the Invention

The present invention relates to a system that includes an information processing apparatus, such as a personal computer or the like, and an output apparatus, such as a printer or the like, and to a printing management method or an authentication method executed in the system.

2. Description of the Related Art

Conventional printing systems utilize a technique called department management in which an ID is provided for each department that uses a printer, a user is authenticated using the ID, and it is allowed, for example, to count the number of obtained printed copies for each department. In a first stage, only numerals have been used for an ID used in the above-described department management, for example, because of limitations in user interfaces. However, this approach is not widely used because its identification capability is inferior and the users cannot easily memorize the numerals. Recently, as a result of technical improvements, it is possible to utilize characters other than numerals, such as alphabet letters, or the like, for an ID by performing a function expansion using a card reader or the like.

Conventionally, if there arises a difference between functions depending on the presence/absence of a function expansion, it is necessary to exactly know whether or not the concerned printer is able to perform a function expansion, and perform a setting corresponding to the current situation before starting printing. If such processing is not performed, expected results cannot be obtained. Particularly, in authentication processing utilizing a department management technique, authentication is prohibited, and printing cannot be performed, thereby causing more problems than in other cases.

SUMMARY OF THE INVENTION

It is an object of the present invention to prevent transfer of an ID, which causes mismatching in a connected printing apparatus (printer), by automatically discriminating a functional level of the printing apparatus internally and determining whether or not an ID corresponding to the discriminated functional level is used during authentication processing, and to improve availability of the ID by providing an arrangement such that a user need not be aware of a difference between IDs between different printing apparatuses.

According to one aspect of the present invention, a printing management system for managing use of a printing apparatus based on identification information includes function acquisition means for acquiring a function of authentication processing of a printing apparatus that performs authentication processing based on inputted identification information, determination means for determining whether or not the authentication processing of the printing apparatus is able to process the inputted identification information, based on the function acquired by the function acquisition means, and conversion means for converting a data format of the inputted identification information, when a result of a determination by the determination means is negative.

According to another aspect of the present invention, a printing management system for managing use of a printing apparatus based on identification information includes function acquisition means for acquiring a function of authentication processing of a printing apparatus that performs authentication processing based on inputted identification information, determination means for determining whether or not the authentication processing of the printing apparatus is able to process the inputted identification information, based on the function acquired by the function acquisition means, and display control means for displaying on a display unit a message indicating incapability of performing the authentication processing, when a result of a determination by the determination means is negative.

According to still another aspect of the present invention, a printing management method for managing use of a printing apparatus based on identification information includes a function acquisition step of acquiring a function of authentication processing of a printing apparatus that performs authentication processing based on inputted identification information, a determination step of determining whether or not the authentication processing of the printing apparatus is able to process the inputted identification information, based on the function acquired in the function acquisition step, and a conversion step of converting a data format of the inputted identification information when a result of a determination in the determination step is negative.

According to yet another aspect of the present invention, a printing management method for managing use of a printing apparatus based on identification information includes a function acquisition step of acquiring a function of authentication processing of a printing apparatus that performs authentication processing based on inputted identification information, a determination step of determining whether or not the authentication processing of the printing apparatus is able to process the inputted identification information, based on the function acquired in the function acquisition step, and a display control step of displaying a message indicating incapability of performing the authentication processing, when a result of a determination in the determination step is negative.

According to yet a further aspect of the present invention, a program product for implementing a method used in printing management for managing use of a printing apparatus based on identification information causes a computer to execute a function acquisition step of acquiring a function of authentication processing of a printing apparatus that performs authentication processing based on inputted identification information, a determination step of determining whether or not the authentication processing of the printing apparatus is able to process the inputted identification information, based on the function acquired in the function acquisition step, and a conversion step of converting a data format of the inputted identification information when a result of a determination in the determination step is negative.

According to still another aspect of the present invention, a program for implementing a method used in printing management for managing use of a printing apparatus based on identification information causes a computer to execute a function acquisition step of acquiring a function of authentication processing of a printing apparatus that performs authentication processing based on inputted identification information, a determination step of determining whether or not the authentication processing of the printing apparatus is able to process the inputted identification information, based on the function acquired in the function acquisition step, and a display control step of displaying a message indicating incapability of performing the authentication processing on a display unit, when a result of a determination in the determination step is negative.

According to still another aspect of the present invention, an authentication method in a system for managing use of a printing apparatus based on identification information includes the steps of acquiring a function of authentication processing of an authentication apparatus that performs authentication processing based on inputted identification information, determining whether or not the authentication processing of the authentication apparatus is able to process the inputted identification information, based on the acquired function, and converting a data format of the inputted identification information when a result of a determination in the determination step is negative.

According to still another aspect of the present invention, an authentication method in a system for managing use of a printing apparatus based on identification information includes the steps of acquiring a function of authentication processing of an authentication apparatus that performs authentication processing based on inputted identification information, determining whether or not the authentication processing of the authentication apparatus is able to process the inputted identification information, based on the acquired function, and displaying a message indicating incapability of performing the authentication processing on a display unit, when a result of a determination in the determination step is negative.

The foregoing and other objects, advantages and features of the present invention will become more apparent from the following detailed description of a preferred embodiment taken in conjunction with the accompanying drawings.

DETAILED DESCRIPTION OF THE PREFERRED EMBODIMENT

A preferred embodiment of the present invention will now be described with reference to the drawings.

Figure 1:
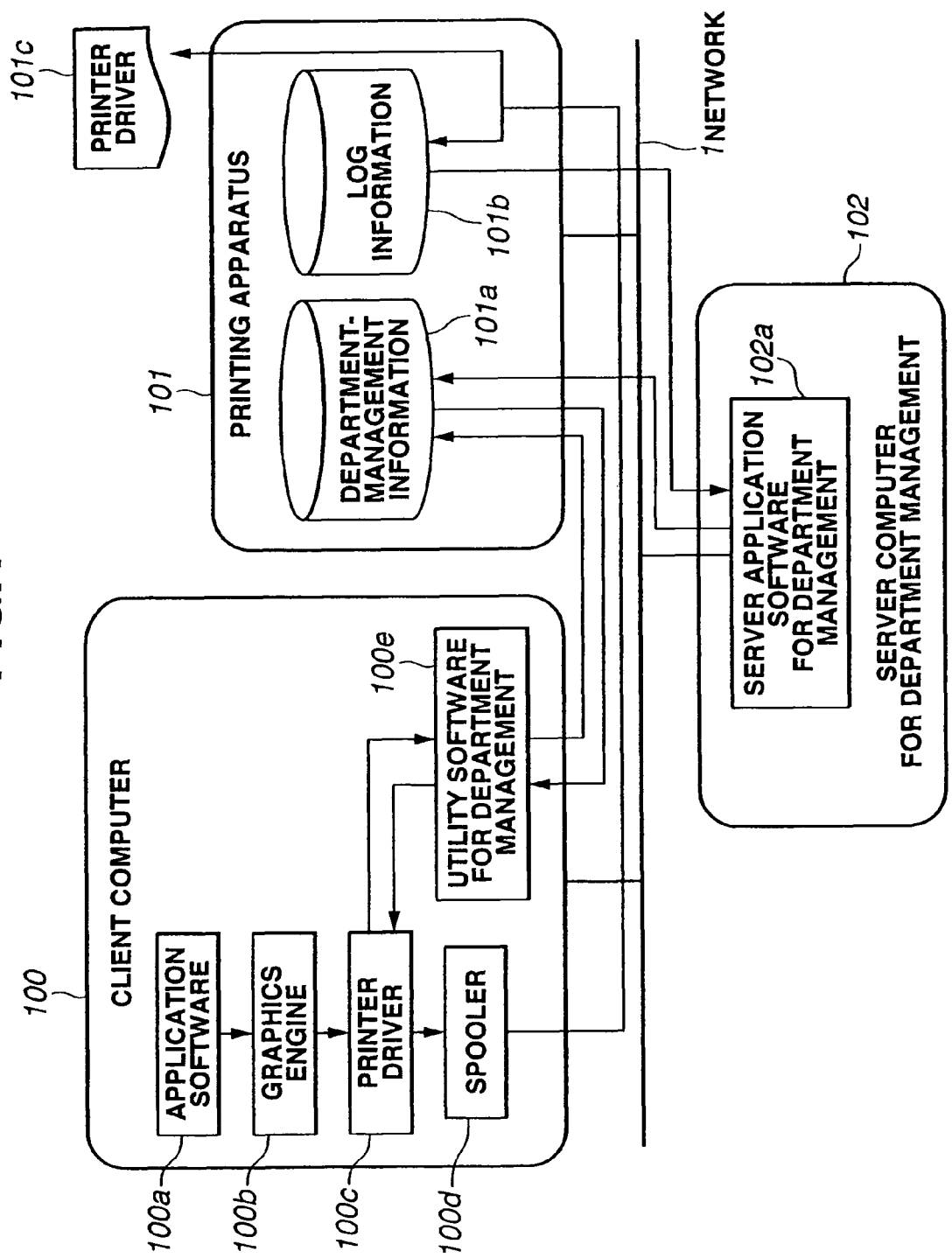
FIG. 1 is a functional block diagram illustrating a department management system.

First, a department management system according to the embodiment will be described. FIG. 1 is a functional block diagram illustrating a department management system. In FIG. 1, a client computer 100, a printing apparatus 101 and a server computer 102 for department management are interconnected via a network 1. Although in. FIG. 1 only a single client computer 100 and a single printing apparatus 101 are illustrated, a plurality of client computers and a plurality of printing apparatuses may also be connected via the network 1.

The printing apparatus 101 may be a laser-beam printer, an ink-jet printer, a copier, a composite apparatus, a facsimile apparatus, or the like.

An operating system (hereinafter abbreviated as an "OS") is installed in the client computer 100, and application software 100a and a printer driver 100c that are necessary for printing processing are installed in the OS.

Printing processing is usually started by a user's assignment in the application software 100a. Upon start of the printing processing, the application software 100a provides a graphics engine 100b of the OS with a GDI (Graphical Device Interface). The graphics engine 100b converts the received GDI into a DDI (Device Driver Interface), and transmits the DDI to the printer driver 100c.

The printer driver 100c that has received the DDI converts the DDI into data that depends on the printing apparatus 101, for example, printing data described in the PDL (Process Design Language), or the like, and provides a spooler 100d of the OS with the printing data as a printing job.

The printing job provided to the spooler 100d is transferred to the assigned printing apparatus 101 according to a port management function of the OS. The printing apparatus 101 performs printing processing in accordance with the assignment of the received printing job.

Utility software 100e for department management is installed in the client computer 100. The utility software 100e has the function of performing two-way communication with the printing apparatus 101, and makes an inquiry about authentication (to be described later) using this function.

The printing apparatus 101 has the function of department management. More specifically, the printing apparatus 101 stores information necessary for department management, such as department-management information 101a, log information 101b, and the like, and performs processing, such as determination of authentication, using the information, and the like.

Server application software 102a for department management is installed in the server computer 102 for department management. The server application software 102 for department management edits the department-management information 101a stored in the printing apparatus 101, acquires the log information 101b stored in the printing apparatus 101, calculates the number of printed copies, and performs accounting for each department based on the acquired log information 101b.

Figure 2:
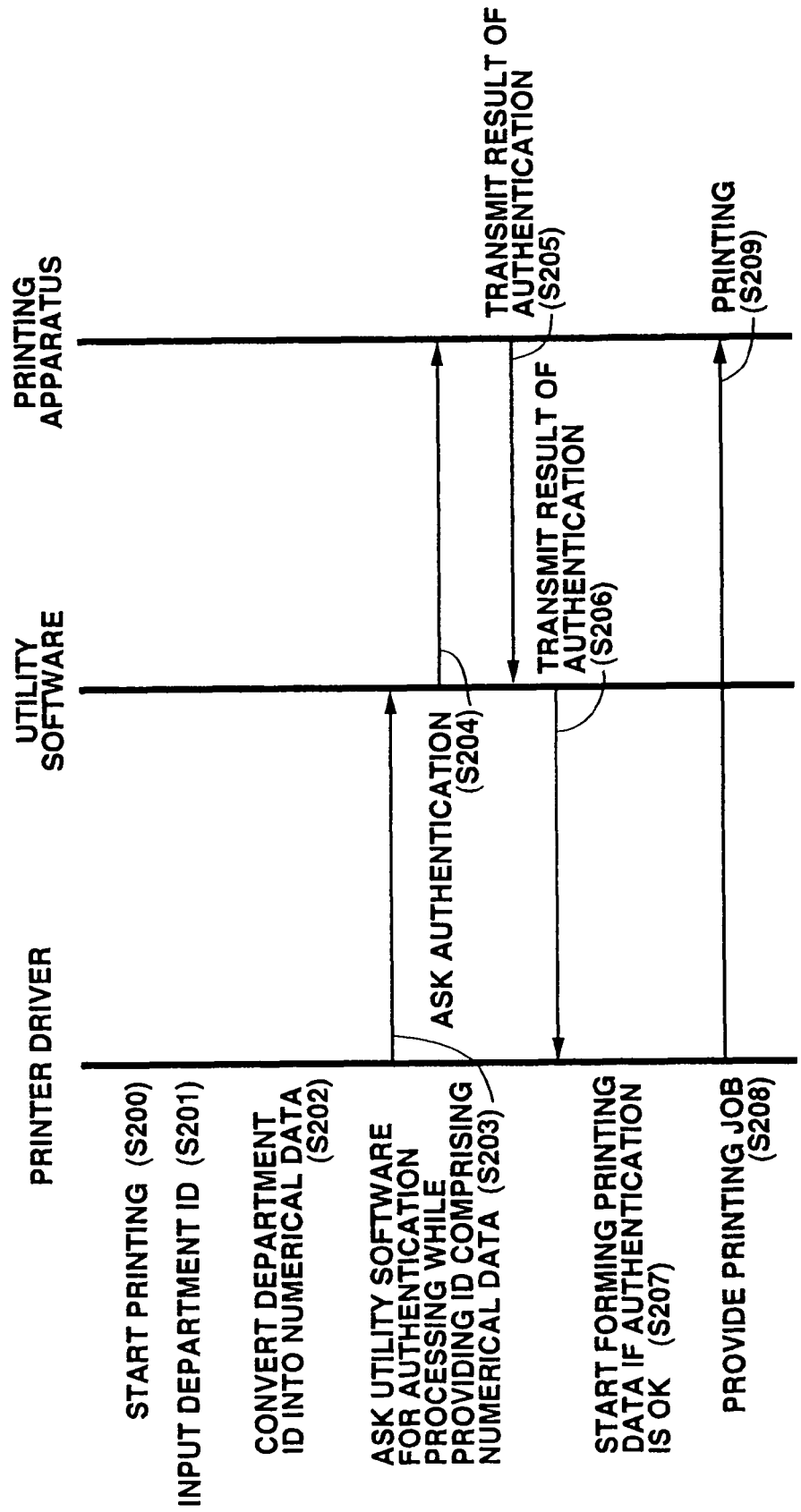
FIG. 2 is a diagram illustrating the flow of a printing process in which department management is performed.

Department management performed in the above-described environment will now be described in accordance with a flow sequence for printing processing. FIG. 2 is a diagram illustrating an outline of the flow of printing processing in which department management is performed Upon start of printing in the application software 100a installed in the client computer 100, the printer driver 100c is started via the graphics engine 100b (step S200). In this environment of department management, authentication processing is generated before the printer driver 100c starts conversion processing to convert received information into printing data.

First, the printer driver 100c that has received an assignment of the DDI from the OS provides the user with a user interface for displaying or inputting information, before starting processing, and urges input of an ID (identification information) for department management, and a password (step S201).

Figure 3:
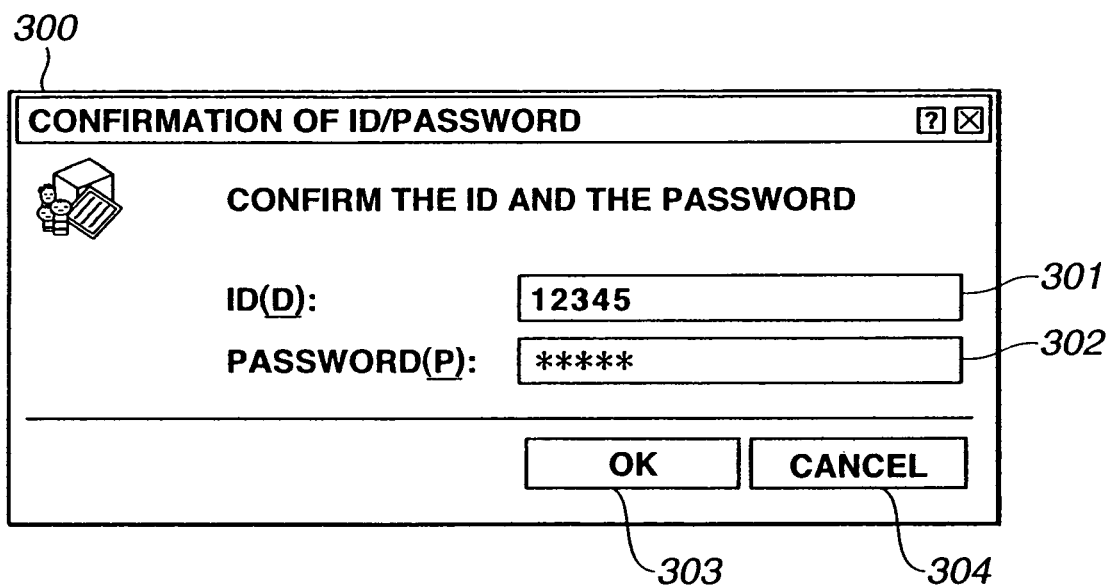
FIG. 3 is a diagram illustrating a user interface screen.

FIG. 3 is a diagram illustrating an example of a user interface screen 300. When the user inputs a department ID and a password in input regions 301 and 302, respectively, and depresses a button 303, authentication processing is started. When a button 304 is depressed, authentication processing is interrupted (omitted), and processing to form printing data is started. However, insertion of a department management ID into a printing job (to be described later) is not performed. Accordingly, whether or not the printing job is printed depends on whether or not a setting at the printing apparatus 101 permits the printing. When a password is not set at the printing apparatus 101 to be authenticated, a password need not be inputted. Although not particularly described hereinafter, a password is always added as one of the sets of information included in a department ID.

As a result of input of necessary information (step S201), authentication processing is started. Then, the department ID is converted into numerical data (step S202). This operation will be described in detail later.

The department ID inputted to the printer driver 100c via a user interface 300 is transferred to the utility software 100e for department management together with a request for authentication processing (step S203). The utility software 100e for department management asks the printing apparatus 101 whether or not the department ID is valid, using the two-way communication function with the printing apparatus 101 (step S204). The printing apparatus 101 compares this inquiry with the department-management information 101a registered in advance within the printing apparatus 101 to evaluate validity of the department ID, and transmits the result of determination to the utility software 100e for department management (step S205).

The utility software 100e for department management notifies the printer driver 101c of the received determination result (step S206). When the determination result indicates validity of the department ID, the printer driver 101c starts processing of converting the DDI received from the OS into printing data (step S207). At that time, the department ID is inserted into the formed printing data.

Figure 4:
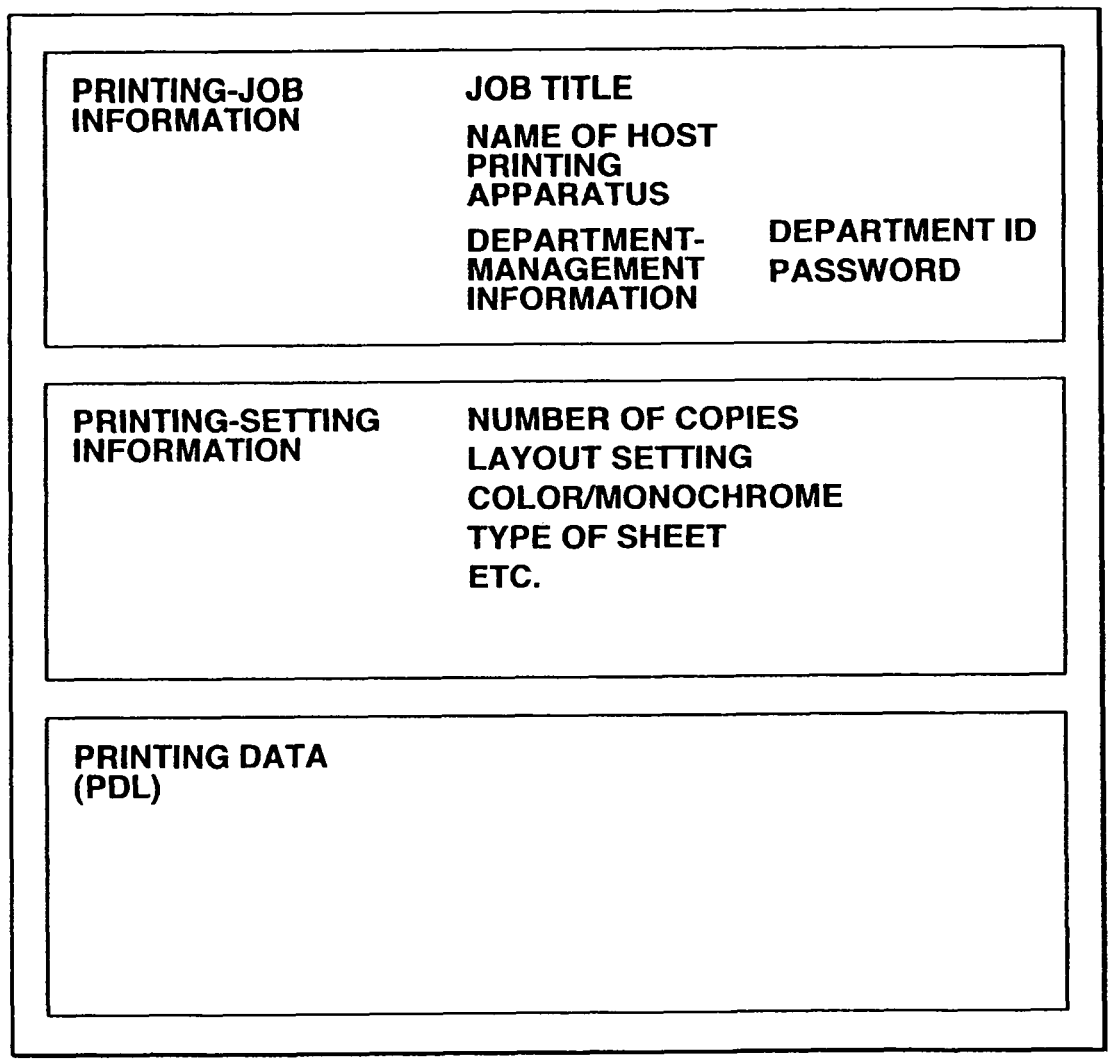
FIG. 4 is a diagram illustrating a data configuration of a formed printing job.

FIG. 4 is a diagram illustrating a data configuration of the formed printing job. Data of the printing job mainly includes printing-job information, printing-setting information, and printing data. The printing-job information includes information indicating the title of the job, information indicating the name of a computer (host computer) that has formed the printing data, and department-management information. The department ID and the password are stored as department management information. The printing-setting information includes the number of printed copies, layout setting, assignment of color/monochrome, and the type of sheets. The printing data is described with the PDL, and an image corresponding to the printing data is printed by the printing apparatus 101.

Figure 5:
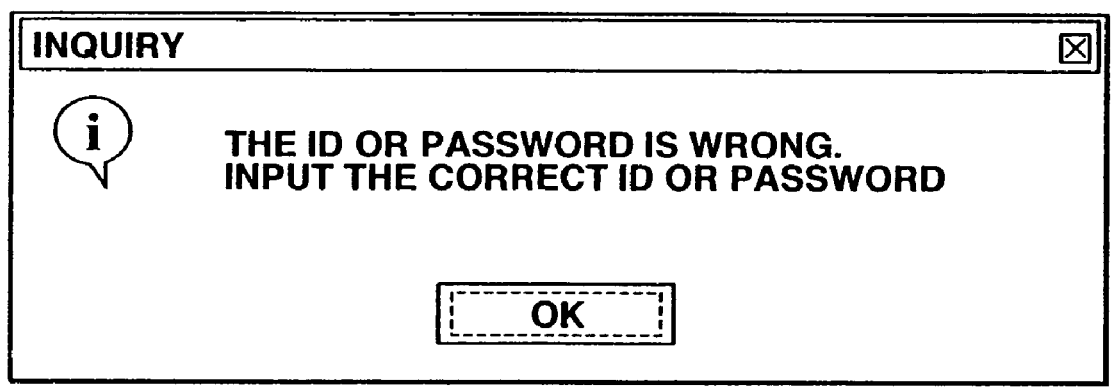
FIG. 5 is a diagram illustrating a user screen indicating failure of authentication.

When it has been determined in the authentication processing in step S207 that the department ID is invalid, a user interface screen indicating the fact is displayed (see FIG. 5), and re-input of a department ID and a password is urged by displaying the user interface screen shown in FIG. 3. Thus, conversion processing into printing data is not performed unless a correct department ID is inputted, and it is possible to limit users of the printing apparatus 101. FIG. 5 is a diagram illustrating a user interface screen indicating that authentication has failed.

As in ordinary printing, the formed printing data is transferred to the assigned printing apparatus 101 via the spooler 100d of the OS (step S208). The printing apparatus 101 executes printing processing based on assignment of the received printing data to generate printing output by the printer driver 101c (step S209). At that time, the printing apparatus 101 stores the department ID inserted in the printing job together with count information of the printing job, such as the number of printed copies, assignment of duplex printing, a particular type of sheets, assignment of monochrome/color, and the like, as the log information 101b.

Thus, the sever application software 102a for department management knows what type of printing is being performed and how the printing apparatus is being used for each department, based on the department ID and count information corresponding to the department ID.

The department-management information 101a used for authentication and the log information 101b used for counting is managed by the server application software 102a for department management. Such management may be performed for a plurality of printing apparatuses interconnected via a network, thereby allowing unitary management of these apparatuses.

Next, a description will be provided of a function expansion for the printing apparatus and a change of the department ID as a result of the function expansion, in an environment having the above-described department management function.

Figure 6:
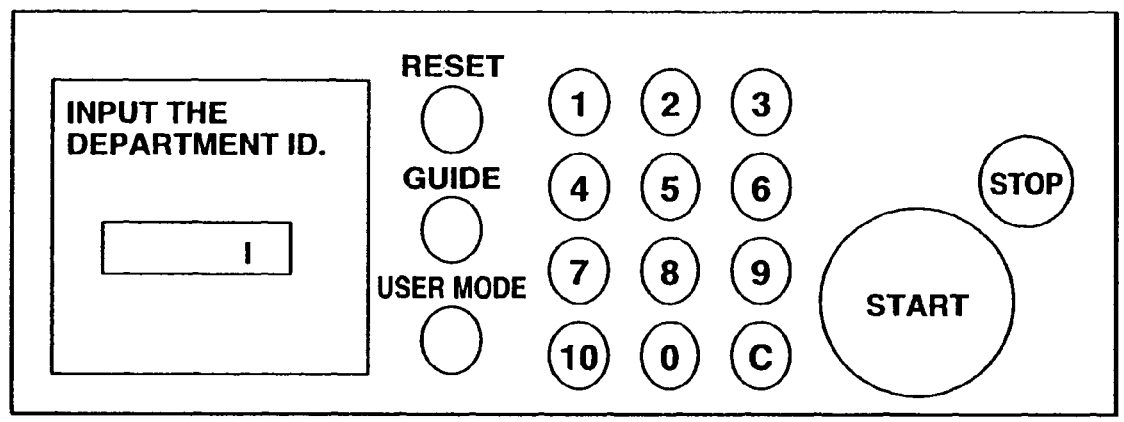
FIG. 6 is a diagram illustrating an input mechanism of a printing apparatus.

In first-stage printing apparatuses, the type of characters that can be used for a department ID is limited, such that only numerals (0-9) can be utilized. This is because only numerals can be inputted using a ten-digit keypad in an input mechanism (main-body operation panel) of a printing apparatus. FIG. 6 is a diagram illustrating an input mechanism of a printing apparatus.

Accordingly, a department ID has been handled as numerical data in internal processing. However, an ID comprising only numerical values has many problems such that, for example, it has a poor identification recognizability, and it is difficult for the user to memorize the ID. Therefore, it is desirable that the user is able to use characters other than numerical values, such as alphabet characters, or the like.

For that purpose, a function expansion is performed using, for example, an optional card-reader unit. It is thereby possible to provide a printing apparatus in which use of a main-body panel is unnecessary to input information, and alphabet characters, or the like, may be used in addition to numerical values for a department ID, without modifying the main body of the printing apparatus.

Figure 7:
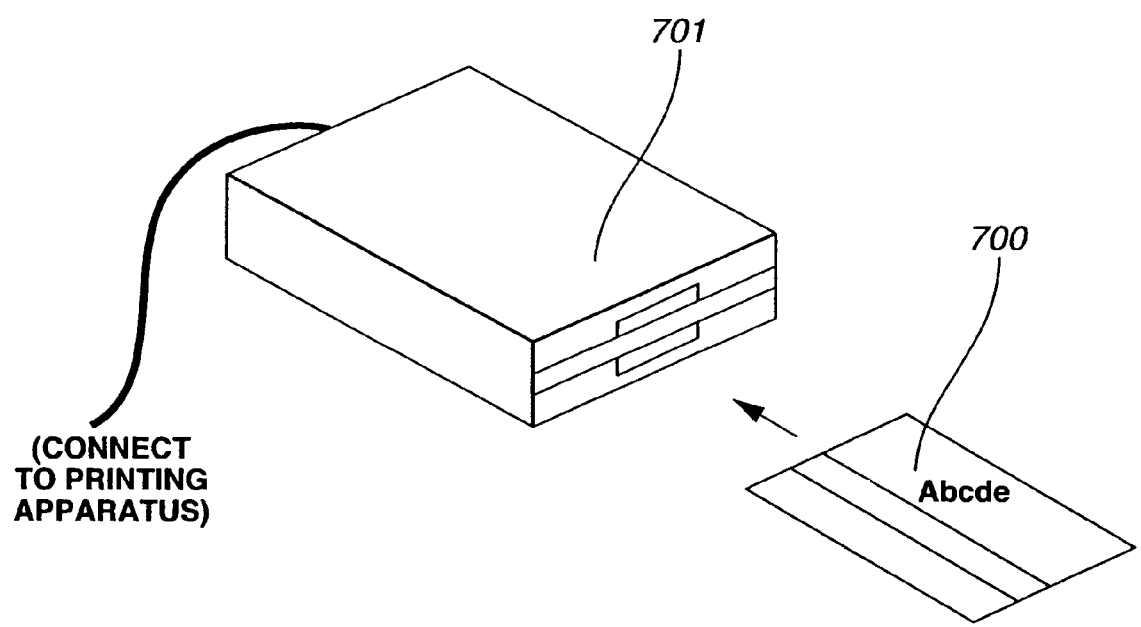
FIG. 7 is a diagram illustrating a card-reader unit.

FIG. 7 is a diagram illustrating a card-reader unit (hereinafter abbreviated as a "card reader"). When the user inserts a card 700 in which information has been recorded magnetically or by using an IC (integrated circuit), or the like, into a card reader 701, the card reader 701 reads recorded contents and inputs information indicating a department ID and a password to the printing apparatus 101. In this configuration, the department ID is provided as character-string data (alphanumeric character codes) instead of numerical data.

Figure 8:
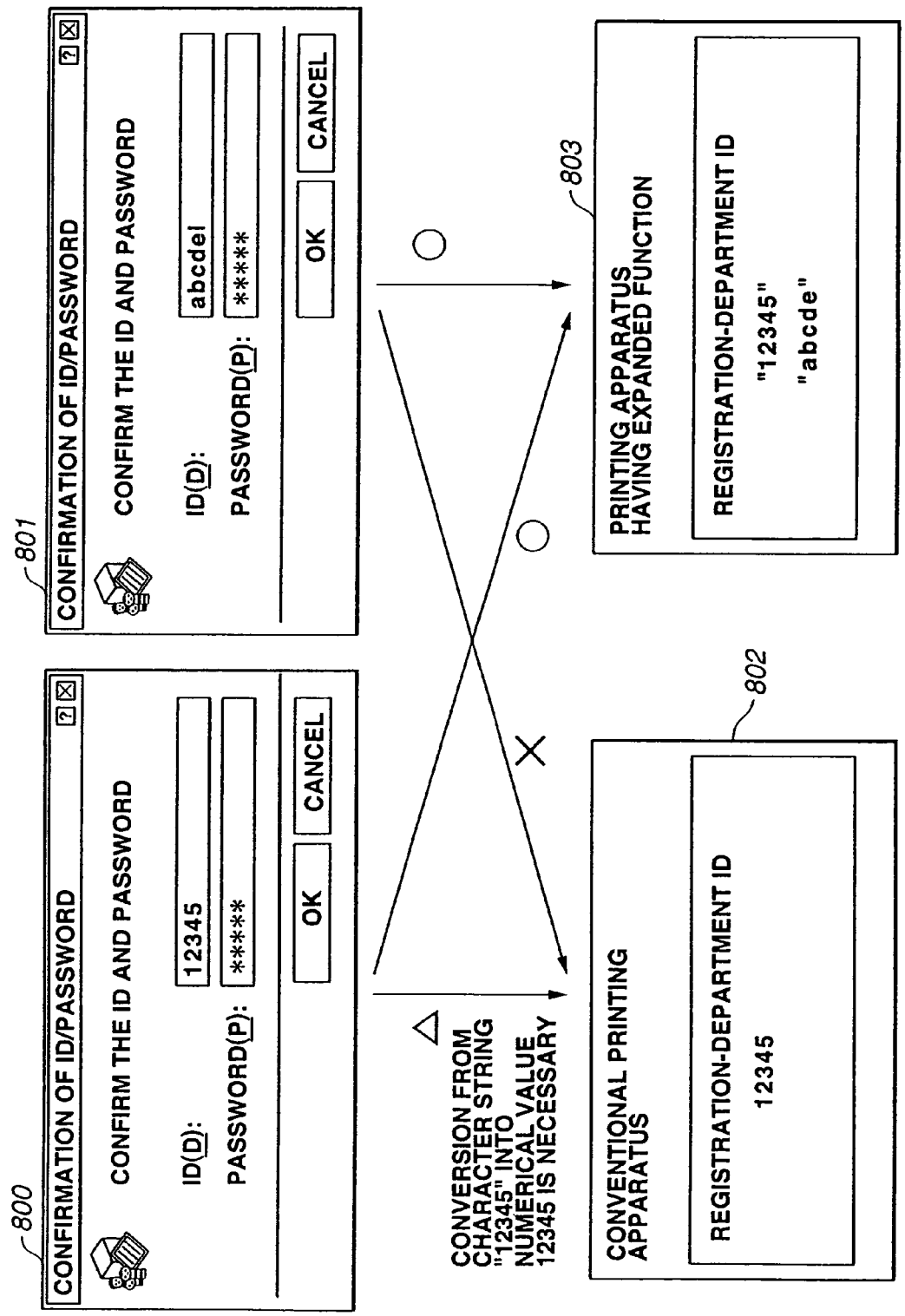
FIG. 8 is a diagram illustrating a comparison between different authentication processings.

As a result of such a function expansion, the following problems arise. FIG. 8 is a diagram illustrating a comparison between authentication processing in a printing apparatus not subjected to a function expansion and authentication processing in a printing apparatus that has been subjected to a function expansion by providing a card reader or the like. In FIG. 8, each of reference numerals 800 and 801 represents an example of input of a department ID by the user. Reference numeral 800 represents input of a department ID comprising only numerals, and reference numeral 801 represents input of a department ID including only alphabet characters. In input operations 800 and 801, different department ID's are inputted on the same input screen. The inputted department ID is handled as character-string data in order to also handle alphabet characters.

Reference numeral 802 represents a printing apparatus that has not been subjected to a function expansion, so that only a department ID comprising numerals may be used. Reference numeral 803 represents a printing apparatus that has been subjected to a function expansion in which a department ID that includes alphabet characters may also be used.

Operations when performing authentication processing for each printing apparatus at each of the above-described input operations will now be considered.

The printing apparatus 803, which has been subjected to a function expansion, is able to perform authentication processing for any ID format of the inputted department ID 800 or 801 by handling the ID as character codes. However, in the case of the printing apparatus 802, which has not been subjected to function expansion, it is necessary to perform conversion from character-string data into numerical data for an ID comprising only numerical values (input 800). Since an ID format that includes characters such as alphabet characters, or the like (as in 801), cannot be processed, it is necessary to prepare some prohibition processing at a preceding stage. Accordingly, a client that inputs a department ID must switch processing depending on a presence/absence of a function expansion in the printing apparatus.

Conventionally, however, when switching processing of a printer driver based on such a function expansion of an apparatus, the user must set in advance information relating to the function expansion via a user interface of the printer driver, or the like. Since the user must exactly know of the function expansion of a printing apparatus and perform a correct setting, this approach is troublesome to the user. If a correct setting is not performed, there is the possibility that an unexpected output result is obtained. Particularly: in processing related to department management, if a setting is incorrect, authentication processing cannot be performed, resulting in the possibility that no prints can be obtained.

Accordingly, in the present invention, by automatically determining the functional level of a printing apparatus at each printing processing, and automatically switching to an appropriate processing based on the result of the determination, erroneous processing is prevented, and the user is unaware of a difference between printing apparatuses.

Figure 9:
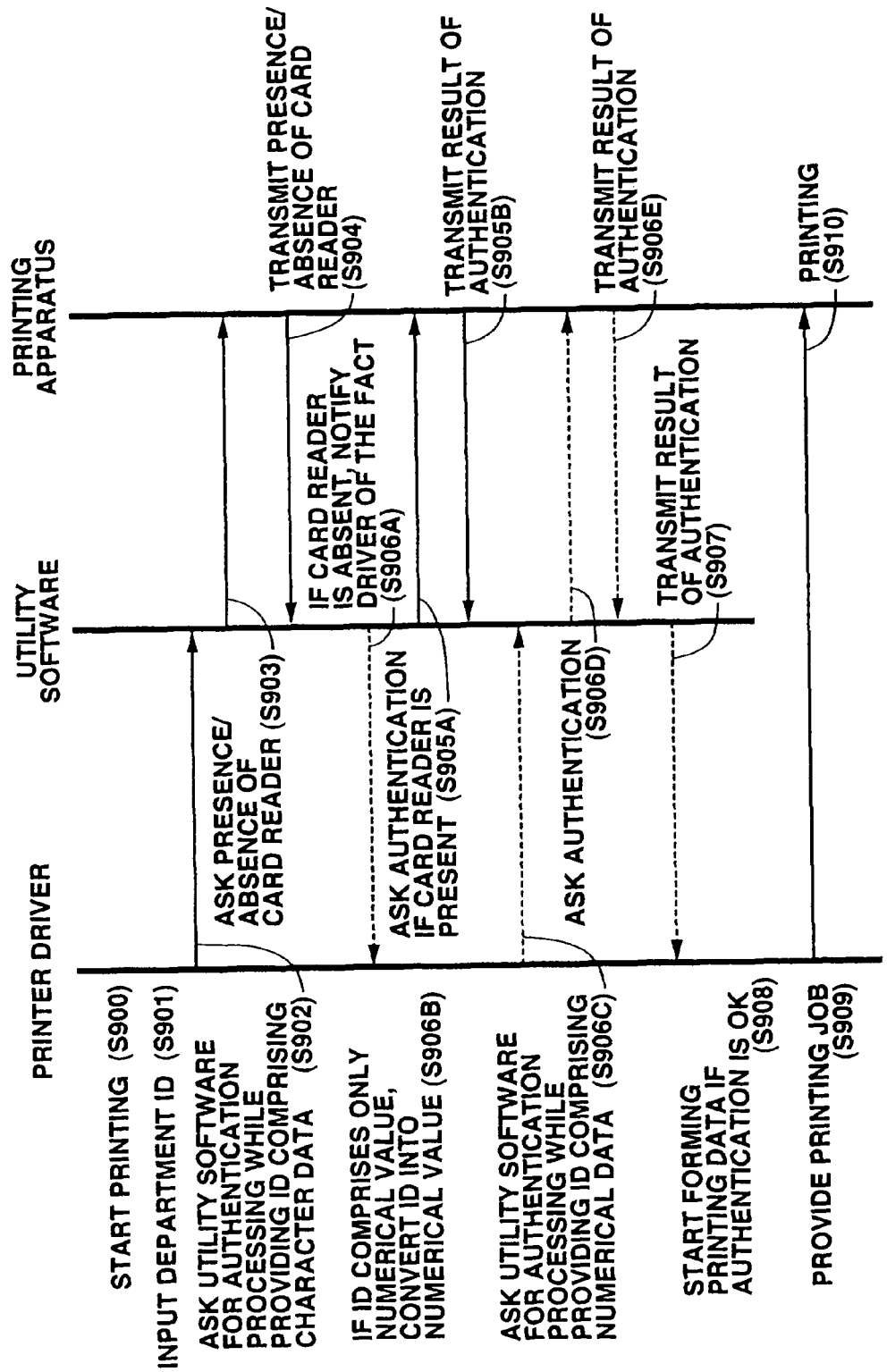
FIG. 9 is a diagram illustrating the flow of a printing process that includes authentication processing.

FIG. 9 is a diagram illustrating the flow of printing processing that includes authentication processing. Upon start of printing processing (step S900), the user interface screen shown in FIG. 3 is displayed as in the case of FIG. 2, and the user is urged to input a department ID and a password (step S901). This user interface is configured so that both numerals and alphabet characters may be used for the department ID irrespective of the presence/absence of function expansion. Accordingly, the user may input a department ID assigned for each printing apparatus without being aware of a difference in the functional levels of the printing apparatuses.

Upon input of the department ID (step S901), a presence/absence of function expansion of the printing apparatus to be used is confirmed. This processing is performed via the utility software 100*e* for department management. First, inquiry of authentication is provided from the printer driver 101*c* to the utility software 100*e* for department management together with the department ID in the form of a character string (character codes) (step S902).

The utility software 100*e* for department management that has received the inquiry asks the printing apparatus 101 about a presence/absence of an optional card reader, as the first step (step S903). The printing apparatus 101 detects a presence-absence of a card reader and transmits the result of detection to the utility software 100*e* for department management (step S904).

After this step, execution steps differ depending on whether or not a card reader is present. When the presence of a card reader has been confirmed, steps S905A-905B are executed. When the presence of a card reader has not been confirmed, steps S906A-S906E are executed.

When the presence of a card reader has been confirmed by a response from the printing apparatus 101, inquiry about authentication is performed using the department ID already received from the printer driver 100*c* (step S905A). The printing apparatus 101 determines a capability/incapability of authentication by comparing the received department ID with the list of department ID's already registered within the printing apparatus 101, and transmits the result of determination to the utility software 100*e* for department management (step S905B). The utility software 100*e* for department management transmits the result to the printer driver 100*c* (step S907). If printing is permitted as the result of authentication, the printer driver 100*c* forms printing data (step S908), and transmits a printing job to the spooler 100*d* by inserting department-management information in the printing job (step S909). Printing is then performed (step S910).

When the printing apparatus 101 does not correspond to a department ID that includes alphabet characters, i.e., when a card reader is not provided, the following operations are performed. In this case, since the presence of a card reader is not recognized, the printing apparatus 101 transmits a response indicating the absence of a card reader (step S904). The utility software 100*e* that has received the response transmits an error code indicating that authentication with character-string data cannot be performed to the printer driver 100*c* (step S906A).

Figure 12:
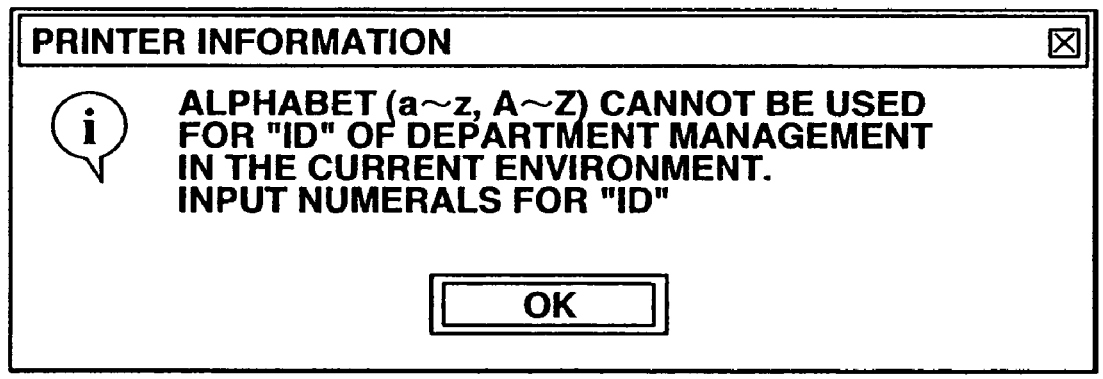
FIG. 12 is a diagram illustrating an error screen, indicating incapability of a authentication process because an alphabet letter is included in a department ID.

The printer driver 100*c* that has received the error code switches from authentication using a department ID comprising character-string data to authentication using a department ID comprising numerical data. If an alphabet character is included in the inputted ID, further processing cannot be performed. Hence, the processing is interrupted, and a warning message (see FIG. 12) is displayed for the user. Then, the process returns to step S901, and a retry is urged by again displaying the user interface screen shown in FIG. 3. FIG. 12 is a diagram illustrating an error picture frame indicating an incapability of authentication processing because an alphabet character is included in the department ID. The user can recognize a difference in printing apparatuses only by this message.

When the inputted ID comprises only numerals, conversion into numerical data may be performed. Hence, conversion processing into numerical data is performed (step S906B). The department ID, which has been converted into the numerical data is again transmitted to ask the utility software 100*e* for department management for authentication processing (step S906C). The utility software 100*e* for department management again asks the printing apparatus 101 about authentication using the department ID with the numerical values received together with the request (step S906D). The printing apparatus 101 determines whether permission/prohibition of printing is appropriate, and transmits the result of the determination to the utility software 100*e* for department management (step S906E).

Then, as in the above-described manner, the utility software 100e for department management transmits the result to the printer driver 100c (step S907). If the result of authentication permits printing, the printer driver 100c forms printing data (step S908), and transmits a printing job to the spooler 100d by inserting department-management information in the printing job (step S909). Printing is then performed (step S910).

When an indication of incapability has been transmitted as the result of an authentication, a message indicating failure of authentication (see FIG. 5) is displayed as in the above-described manner, and the process returns to step S901, where the user interface screen shown in FIG. 3 is displayed in order to urge re-input of a department ID and a password.

As described above, by automatic internal determination of a presence/absence of function expansion by the printer driver 100c and the utility software 100e for department management, it is possible to provide a conventional department management function without indicating a difference between printing apparatuses to a user unless the user provides an erroneous input. At the same time, it is possible to prevent the problem that authentication processing is performed using an improper department ID due to an incorrect setting.

Figure 10:
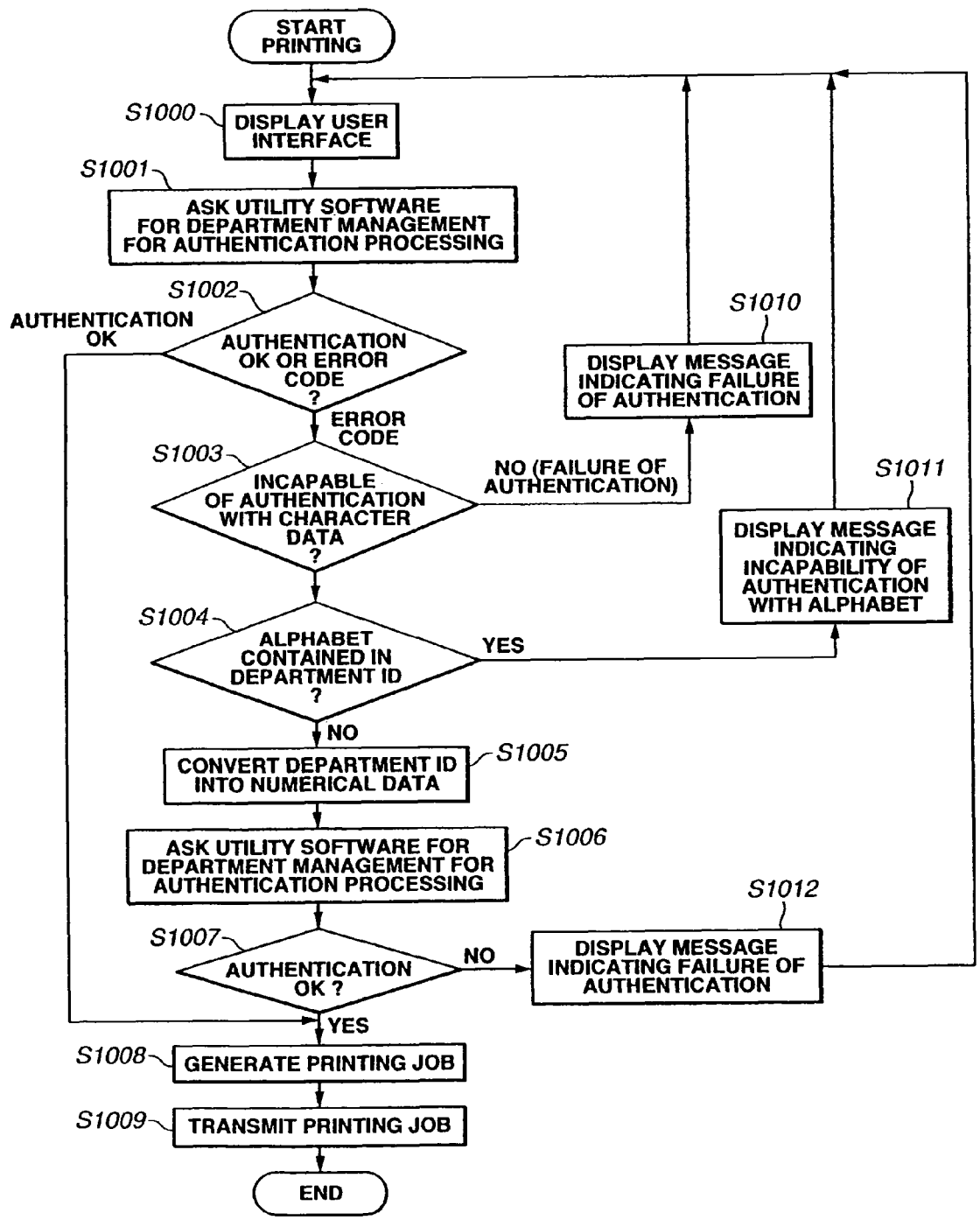
FIG. 10 is a flowchart illustrating a printing process to be executed by a printer driver.

FIG. 10 is a flowchart illustrating printing processing executed by the printer driver 100c. This processing is executed when an instruction for printing is inputted to the application software 100a. First, the printer driver 100c displays the user interface screen shown in FIG. 3, and urges the user to input a department ID and a password (step S1000). Thereafter, when the department ID and the password has been inputted and an OK button 303 has been depressed, the input department ID and the password are transmitted to the utility software 100e for department management, and authentication processing is requested (step S1001).

Then, transmission of information from the utility software 100e for department management is awaited. Upon transmission of the information, it is determined whether the information is an error code or information indicating permission of authentication (step S1002). If authentication is permitted, the process proceeds to step S1008. If an error code has been transmitted, the process proceeds to step S1003.

In step S1003, the contents of the error code are discriminated in order to determine whether the contents indicate an error indicating incapability of authentication of character-string data or an error indicating failure of authentication (step S1003). In the case of failure of authentication, a message indicating failure of authentication is displayed as shown in FIG. 5 (step S1010), and the process returns to step S1000 in order to again urge input of a department ID and a password.

If the error code indicates incapability of authentication with a department ID having data in the form of a character string as a result of a determination in step S1003, it is then determined in step S1004 whether or not an alphabet character is included in the inputted department ID (step S1004). If the result of the determination in step S1004 is affirmative, since further processing cannot be performed, a message indicating incapability of authentication processing with a department ID that includes an alphabet character is displayed (step S1011), and then the process returns to step S1000 in order to again urge input of a department ID and a password.

If the result of the determination in step S1004 is negative, i.e., if the inputted department ID comprises only numerals, conversion processing into numerical data is performed (step S1005). Then, the department ID comprising the numerical data is transmitted to the utility software 100e for department management, and authentication processing is again requested (step S1006).

Then, transmission of information from the utility software 100e for department management is awaited. Upon transmission of the information, it is then determined whether the information indicates permission of authentication processing or failure of authentication (step S1007). If authentication is permitted, data of a printing job including the department ID is generated (step S1008), and the generated data is transmitted to the printing apparatus 101 (step S1009).

If it has been determined in step S1007 that authentication has failed, a message indicating failure of authentication is displayed (step S1012), and then the process returns to step S1000 in order to again urge input of a department ID and a password.

Figure 11:
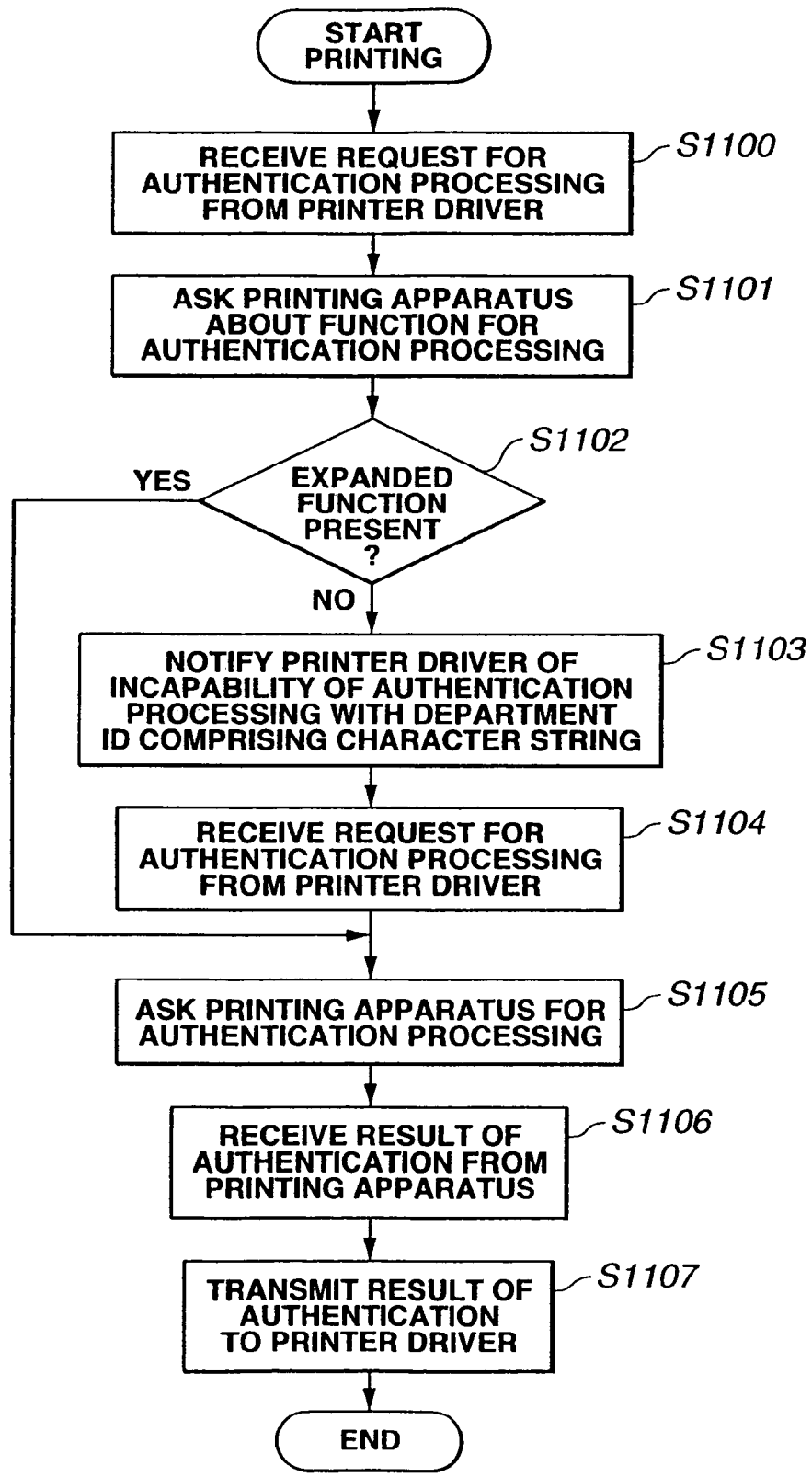
FIG. 11 is a flowchart illustrating an authentication process to be executed by utility software for a department management system.

FIG. 11 is a flowchart illustrating authentication processing to be executed by the utility software 100e for department management. First, a request of authentication processing is received from the printer driver 100c (step S1100). At that time, data indicating a department ID is also received. Then, the printing apparatus 101 is asked about a function for authentication processing possessed by the printing apparatus 101 (step S1101). More specifically, whether or not a card reader is possessed (or connected) may be directly asked.

Then, it is determined whether or not the printing apparatus 101 has a function necessary for authentication processing based on a response from the printing apparatus 101 (step S1102). More specifically, it is determined whether or not the printing apparatus 101 can authenticate a department ID comprising character-string data. If the result of the determination in step S1102 is affirmative, because the printing apparatus 101 has an expanded function, the process proceeds to step S1105.

If the result of the determination in step S1102 is negative, the fact is notified to the printer driver 100c (step S1103). More specifically, the fact that authentication processing cannot be performed with a department ID comprising character-string data is notified.

Thereafter, the printer driver 100c converts the department ID into numerical data. Then, a request for authentication processing is again received together with the department ID comprising numerical data (step S1104).

After step S1102 or step S1104, a request for authentication processing is transmitted to the printing apparatus 101 based on the department ID transmitted from the printer driver 100c (step S1105). Then, a result of authentication is received from the printing apparatus 101 (step S1106), and the result is transmitted to the printer driver 100c (step S1107).

In the foregoing description, the department ID may be identification information for identifying a host computer or identification information for identifying a user, instead of identification information for identifying a department.

The present invention may, of course, also be achieved by supplying a system or an apparatus with a storage medium storing program codes of software (program codes corresponding to the flowcharts shown in FIGS. 9-11) for realizing the functions of the above-described embodiment, and reading and executing the program codes stored in the storage medium by means of a computer (or a CPU (central processing unit) or an MPU (microprocessor unit) of the client computer 100) of the system or the apparatus.

In this case, the program codes themselves read from the storage medium realize the new functions of the present invention, so that the storage medium storing the program codes constitutes the present invention.

For example, a floppy disk, a hard disk, a magnetooptical disk, an optical disk, a CD (compact disc)-ROM (read-only memory), a CD-R (recordable), a magnetic tape, a nonvolatile memory card, a ROM, a DVD (digital versatile disc), a DVD-ROM, or the like, may be used as the storage medium for supplying the program codes.

The present invention may, of course, be applied not only to a case in which the functions of the above-described embodiment are realized by executing program codes read by a computer, but also to a case in which an OS, or the like, operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU, or the like, provided in the function-expanding board or the function expanding unit performs a part or the entirety of actual processing, and the functions of the above-described embodiment are realized by the processing.

The present invention may, of course, also be applied to a case in which a program is distributed to a requester from a storage medium recording program codes of software for realizing the functions of the above-described embodiment via a communication line, such as personal-computer communication, or the like.

As described above, according to the present invention, by determining a presence/absence of a function necessary for authentication processing, a department management function, as in the conventional approach, is provided without indicating to a user a difference between functions, or at least to minimize such indication. It is thereby possible to improve a general usability for the user, and prevent problems that are expected, to arise when the user utilizes a printing apparatus without understanding a difference between the functions of printers.

More specifically, it is determined whether or not a printing apparatus can perform authentication processing for a department ID in the form of a character string. If the result of the determination is affirmative, authentication processing is performed. If the result of the determination is negative, by converting the department ID into numerical data or causing the user to again input a department ID, it is possible to prevent problems such that authentication is not permitted and printing is not performed at all.

The individual components shown in outline or designated by blocks in the drawings are all well known in the art of printing management systems and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing management system for managing use of a printing apparatus based on identification information, said system comprising:

an input unit which is constructed to input a first type of identification information and a second type of identification information;

an acquisition unit constructed to acquire, from the printing apparatus, information indicating a capability of authentication processing of the printing apparatus;

a first determination unit constructed to determine, based on the information acquired by said acquisition unit, whether the printing apparatus is or is not capable of processing the first type of identification information;

a requesting unit responsive to a determination that the printing apparatus is capable of processing the first type of identification information, wherein said requesting unit is constructed to request the printing apparatus to perform the authentication processing based on the identification information input by said input unit no matter whether the input identification information is the first type of identification information or the second type of identification information;

a second determination unit responsive to a determination that the printing apparatus is not capable of processing the first type of identification information, wherein said second determination unit is constructed to determine whether the identification information input by said input unit is the first type of identification information or the second type of identification information; and a display control unit responsive to a determination that the input identification information is the first type of identification information and to a determination that the printing apparatus is not capable of processing the first type of identification information, wherein said display control unit is constructed to display on a display unit a message indicating incapability of performing the authentication processing, wherein the display is performed without requesting the printing apparatus to perform the authentication processing, wherein the first type of identification information includes an alphabetic character, and the second type of identification information does not include an alphabetic character.

2. A printing management system according to claim 1, wherein said display control unit displays an input screen for inputting the identification information in response to input of an instruction for printing, and again displays the input screen when the result of the determination by said second determination unit is that the identification information input by said input unit is the first type of identification information.

3. A printing management method for managing use of a printing apparatus based on identification information, said method comprising:

an inputting step of inputting either a first type of identification information or a second type of identification information;

an acquisition step of acquiring, from the printing apparatus, information indicating a capability of authentication processing of the printing apparatus;

a first determination step of determining, based on the information acquired in said acquisition step, whether the printing apparatus is or is not capable of processing the first type of identification information;

responsive to a determination that the printing apparatus is capable of processing the first type of identification information, a requesting step of requesting the printing apparatus to perform the authentication processing based on the identification information input in said inputting step no matter whether the input identification information is the first type of identification information or the second type of identification information;

responsive to a determination that the printing apparatus is not capable of processing the first type of identification information, a second determination step of determining whether the identification information input in said inputting step is the first type of identification information or the second type of identification information; and responsive to a determination that the input identification information is the first type of identification information and to a determination that the printing apparatus is not capable of processing the first type of identification information, a display control step of displaying on a display unit a message indicating incapability of performing the authentication processing, wherein the display is performed without requesting the printing apparatus to perform the authentication processing, wherein the first type of identification information includes an alphabetic character, and the second type of identification information does not include an alphabetic character.

4. A printing management method according to claim 3, wherein, in said display control step, an input screen for inputting the identification information is displayed in response to input of an instruction for printing, and the input screen is again displayed when the result of the determination in said second determination step is that the identification information input by said inputting step is the first type of identification information.

5. A non-transitory computer-readable memory medium retrievably storing, in executable form, a program product for implementing a printing management method for managing use of a printing apparatus based on identification information, the method comprising:

an inputting step of inputting either a first type of identification information or a second type of identification information;

an acquisition step of acquiring, from the printing apparatus, information indicating a capability of authentication processing of the printing apparatus;

a first determination step of determining, based on the information acquired in said acquisition step, whether the printing apparatus is or is not capable of processing the first type of identification information;

responsive to a determination that the printing apparatus is capable of processing the first type of identification information, a requesting step of requesting the printing apparatus to perform the authentication processing based on the identification information input in said inputting step no matter whether the input identification information is the first type of identification information or the second type of identification information;

responsive to a determination that the printing apparatus is not capable of processing the first type of identification information, a second determination step of determining whether the identification information input in said inputting step is the first type of identification information or the second type of identification information; and responsive to a determination that the input identification information is the first type of identification information and to a determination that the printing apparatus is not capable of processing the first type of identification information, a display control step of displaying on a display unit a message indicating incapability of performing the authentication processing, wherein the display is performed without requesting the printing apparatus to perform the authentication processing, wherein the first type of identification information includes an alphabetic character, and the second type of identification information does not include an alphabetic character.

6. A non-transitory computer-readable memory medium according to claim 5, wherein, in said display control step, an input screen for inputting the identification information is displayed in response to input of an instruction for printing, and the input screen is again displayed when the result of the determination in said second determination step is that the identification information input in said inputting step is the first type of identification information.

7. An authentication method comprising the steps of:

inputting either a first type of identification information or a second type of identification information;

acquiring, from an authentication apparatus, information indicating a capability of authentication processing of the authentication apparatus;

determining, based on the acquired information, whether the authentication apparatus is or is not capable of processing the first type of identification information;

responsive to a determination that the authentication apparatus is capable of processing the first type of identification information, requesting the authentication apparatus to perform the authentication processing based on the input identification information no matter whether the input identification information is the first type of identification information or the second type of identification information;

responsive to a determination that the authentication apparatus is not capable of processing the first type of identification information, determining whether the input identification information is the first type of identification information or second type of identification information; and responsive to a determination that the input identification information is the first type of identification information and to a determination that the authentication apparatus is not capable of processing the first type of identification information, displaying on a display unit a message indicating incapability of performing the authentication processing, wherein the display is performed without requesting the authentication apparatus to perform the authentication processing, wherein the first type of identification information includes an alphabetic character, and the second type of identification information does not include an alphabetic character.

8. An information processing apparatus comprising:

an input unit which is constructed to input a first type of identification information and a second type of identification information;

an acquisition unit constructed to acquire, from an authentication apparatus, information indicating a capability of authentication processing of the authentication apparatus;

a first determination unit constructed to determine, based on the information acquired by said acquisition unit, whether the authentication apparatus is or is not capable of processing the first type of identification information;

a requesting unit responsive to a determination that the authentication apparatus is capable of processing the first type of identification information, wherein said requesting unit is constructed to request the authentication apparatus to perform the authentication processing based on the identification information input by said input unit no matter whether the input identification information is the first type of identification information or the second type of identification information;

a second determination unit responsive to a determination that the authentication apparatus is not capable of processing the first type of identification information, wherein said second determination unit is constructed to determine whether the identification information input by said input unit is the first type of identification information or the second type of identification information; and a display control unit responsive to a determination that the input identification information is the first type of identification information and to a determination that the authentication apparatus is not capable of processing the first type of identification information, wherein said display control unit is constructed to display on a display unit a message indicating incapability of performing the authentication processing, wherein the display is performed without requesting the printing apparatus to perform the authentication processing, wherein the first type of identification information includes an alphabetic character, and the second type of identification information does not include an alphabetic character.

* * * * *